(12) United States Patent
Iwahara et al.

(10) Patent No.: US 8,572,806 B2
(45) Date of Patent: Nov. 5, 2013

(54) GROMMET

(75) Inventors: Toshio Iwahara, Okazaki (JP);
Takahiro Sugiyama, Anjo (JP); Keiji Okaichi, Okazaki (JP); Hayato Kamigashima, Kariya (JP)

(73) Assignee: Daiwa Kasei Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/480,602

(22) Filed: May 25, 2012

(65) Prior Publication Data

US 2012/0297573 A1 Nov. 29, 2012

(30) Foreign Application Priority Data

May 26, 2011 (JP) ................................. 2011-117785

(51) Int. Cl.
*F16L 5/00* (2006.01)
(52) U.S. Cl.
USPC .................................... 16/2.1; 16/2.2; 16/2.5
(58) Field of Classification Search
USPC ............... 16/2.1, 2.2, 2.5; 174/152 R, 152 G, 174/153 G, 154, 167, 650, 659, 660, 668; 277/602, 606, 608; 248/56, 68.1, 74.1, 248/74.2, 74.3, 231.9
See application file for complete search history.

(56) References Cited

U.S. PATENT DOCUMENTS

| | | | | |
|---|---|---|---|---|
| 4,959,509 A | * | 9/1990 | Takeuchi et al. | ............... 277/606 |
| 6,211,464 B1 | * | 4/2001 | Mochizuki et al. | ........... 174/659 |
| 6,685,195 B2 | * | 2/2004 | Uchida et al. | ................. 277/628 |
| 6,708,366 B2 | * | 3/2004 | Ono et al. | ......................... 16/2.5 |
| 6,941,714 B2 | * | 9/2005 | Nakamura | ...................... 52/395 |
| 2003/0098171 A1 | * | 5/2003 | Sato | ............................ 174/65 G |

FOREIGN PATENT DOCUMENTS

JP 08195135 A * 7/1996
JP 2004-312927 11/2004

* cited by examiner

*Primary Examiner* — Chuck Mah
(74) *Attorney, Agent, or Firm* — Christensen Fonder P.A.

(57) ABSTRACT

A grommet configured to seal an insertion hole formed in a panel into which a pipe is inserted may include a base that is configured to be connected to the insertion hole, a boot that is integrally formed in the base and has a thinned wall thickness, and at least one rib that is formed in the boot. The boot has a truncated cone-shaped main portion having an insertion bore into which the pipe can be inserted, and a connecting portion that is folded back from a circumferential periphery of the main portion via a folded back portion and is connected to the base. The at least one rib is formed in the main portion and the connecting portion while straddling the folded back portion, so as to restrict the main portion from being axially displaced relative to the base.

3 Claims, 7 Drawing Sheets

GROMMET

BACKGROUND OF THE INVENTION

1. Field of the Invention

The present invention relates to a grommet. More particularly, the present invention relates to a grommet that is attached to an insertion hole formed in a panel (e.g., a vehicle body panel) in order to seal the insertion hole into which a pipe is inserted.

2. Description of Related Art

A known grommet of this type is taught by, for example, Japanese Laid-Open Patent Publication Number 2004-312927. As shown in FIGS. 7 to 11, the grommet 101 has a base 110 and boots 120. The base 110 is configured to be introduced into an insertion hole 142 formed in a panel 140. Each of the boots 120 is integrally formed in the base 110 and has a thinned wall thickness. The boots 120 are composed of truncated cone-shaped main portions 122 and connecting portions 124. The main portions 122 respectively have insertion bores 122a into which pipes 150 are inserted. The connecting portions 124 are respectively folded back from circumferential peripheries of the main portions 122 via folded back portions and are connected to the base 110. According to the grommet 101 thus constructed, the main portions 122 of the boots 120 can be flexibly displaced or moved relative to the base 110. Therefore, the insertion hole 142 can be reliably sealed even if the pipes 150 are not attached or positioned in place, i.e., even if there are variations in attaching positions of the pipes 150.

In order to attach the grommet 101 to the insertion hole 142 through which the pipes 150 are passed, the base 110 is pressed into the insertion hole 142 while the pipes 150 are respectively introduced into the insertion bores 122a of the main portions 122 of the boots 120. However, at this time, the folded back portions of the connecting portions 124 can be unfolded or stretched due to frictional forces produced between the pipes 150 and the insertion bores 122a or interference or contact of the main portions 122 with projected portions 152 that may be inherently formed in the pipes 150. As a result, as shown in FIG. 9, the grommet 101 can be attached to the insertion hole 142 while the main portions 122 can be projected from the base 110.

In such a case, an additional work connecting hoses (not shown) to end portions of the pipes 150 cannot be smoothly performed. Also, in such a case, the connecting portions 124 of the boots 120 are substantially fully stretched, so that movable ranges of the main portions 122 of the boots 120 relative to the base 110 can be limited. As a result, the panel insertion hole 142 of the panel 140 cannot be sufficiently sealed when the pipes 150 are moved or displaced relative to the panel 140.

Thus, as shown in FIGS. 10 and 11, it is necessary to move or return the main portions 122 projected from the base 110 into the base 110 by pressing down the same with user's fingers after the grommet 101 is attached to the insertion hole 142. This work is time-consuming. As a result, working efficiency of a grommet attaching operation can be reduced. Thus, there is a need in the art for an improved grommet.

BRIEF SUMMARY OF THE INVENTION

For example, in one aspect of the present invention, a grommet configured to seal an insertion hole formed in a panel into which a pipe is inserted may include a base that is configured to be connected to the insertion hole, a boot that is integrally formed in the base and has a thinned wall thickness, and at least one rib that is formed in the boot. The boot has a truncated cone-shaped main portion having an insertion bore into which the pipe can be inserted, and a connecting portion that is folded back from a circumferential periphery of the main portion via a folded back portion and is connected to the base. The at least one rib is formed in the main portion and the connecting portion while straddling the folded back portion, so as to restrict the main portion from being axially displaced relative to the base.

According to the aspect of the invention, even when the connecting portion of the boot is applied with a force in a direction to unfold or stretch the folded back portion thereof due to a frictional force produced between the pipe and the insertion bore or interference or contact of the main portion with a projected portion that may be inherently formed in the pipe, the main portion can be prevented from being axially displaced relative to the base by the at least one rib that is formed in the main portion. As a result, when the grommet is attached to the insertion hole, the folded back portion of the connecting portion can be prevented from being unfolded or stretched, so that the main portion can be prevented from being held while it is projected from the base. That is, when the grommet is attached to the insertion hole, the main portion can be automatically positioned and held within the base. Therefore, the grommet can be easily and reliably attached to the insertion hole by simply pressing the base toward the insertion hole without additional work. Thus, the grommet can be quickly attached to the insertion hole. This means that working efficiency of a grommet attaching operation can be increased.

Optionally, the at least one rib may be shaped to have a substantially crank shape.

Other objects, features and advantages of the present invention will be readily understood after reading the following detailed description together with the accompanying drawings and the claims.

DETAILED DESCRIPTION OF THE INVENTION

Next, a representative embodiment of the present invention will be described with reference to FIGS. 1(A) to 6.

A representative grommet 1 is shown in FIGS. 1(A) to 3. Further, the grommet 1 is intended to be attached to an insertion hole 42 formed in a panel 40 in order to seal the insertion hole 42 into which at least one (two in this embodiment) pipes 50 are inserted (FIGS. 4(A) to 6). An example of the panel 40 is a compartment panel (a dash panel) that isolates a vehicle cabin (not shown) from an engine compartment (not shown). Conversely, examples of the pipes 50 are low-pressure pipes and high-pressure pipes used in an air-conditioning device of a vehicle.

Figure 6:
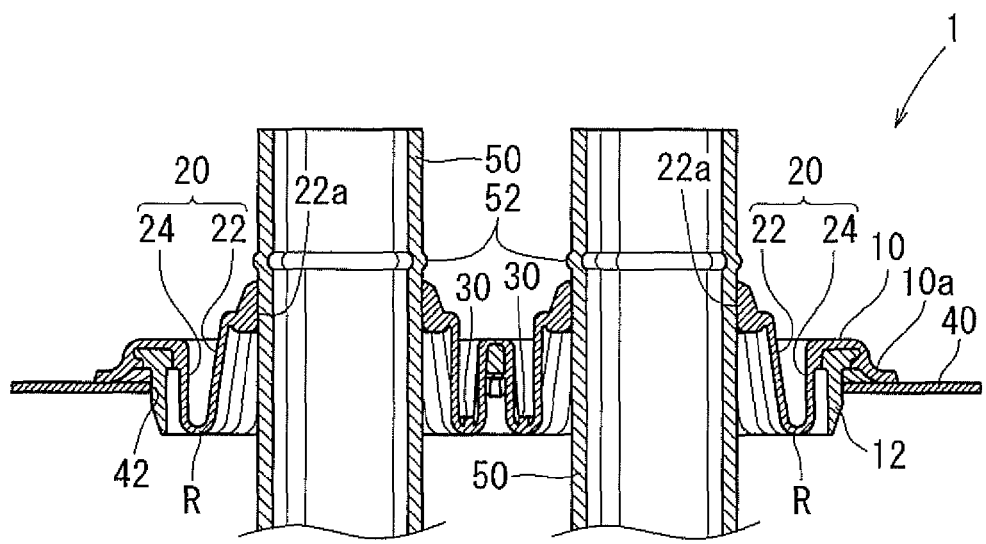
FIG. 6 is an explanatory cross-sectional view illustrating the grommet attaching operation, which view corresponds to a condition in which the grommet is completely attached to the panel insertion hole.
Figure 7:
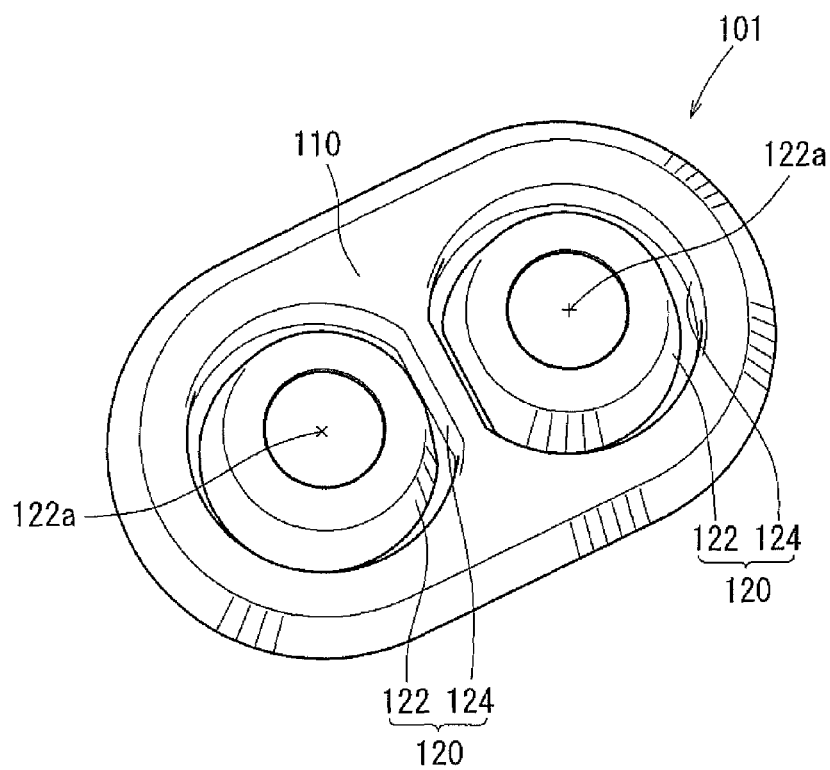
FIG. 7 is a perspective view of a conventional grommet, which is viewed from above.
Figure 8:
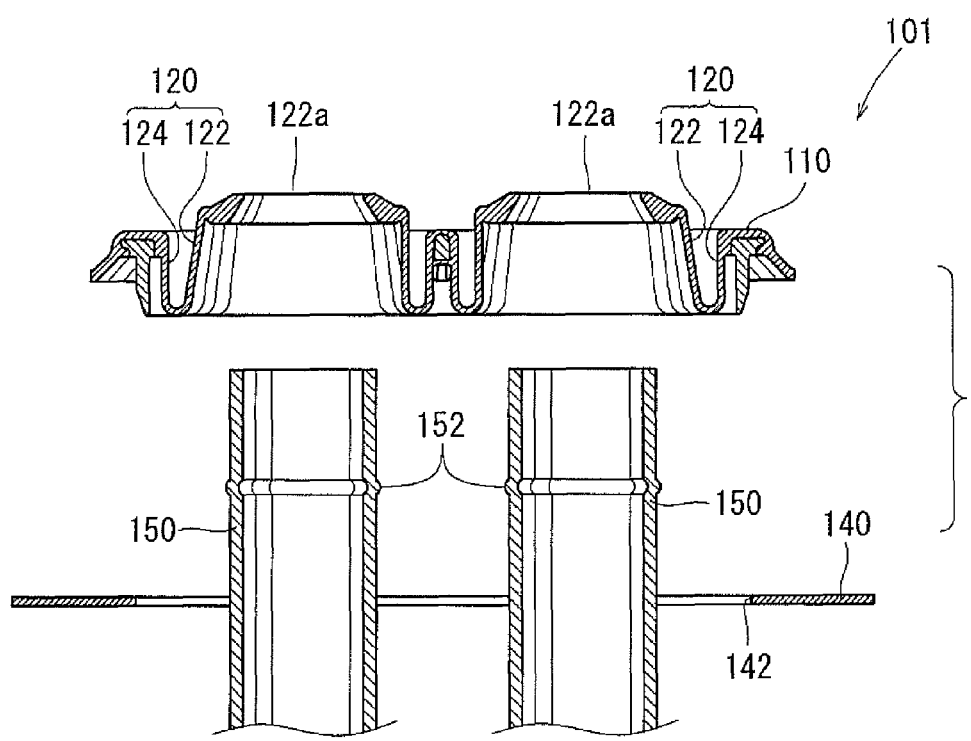
FIG. 8 is an explanatory cross-sectional view illustrating a grommet attaching operation, which view corresponds to a condition before the grommet is attached to a panel insertion hole through which pipes are passed.
Figure 9:
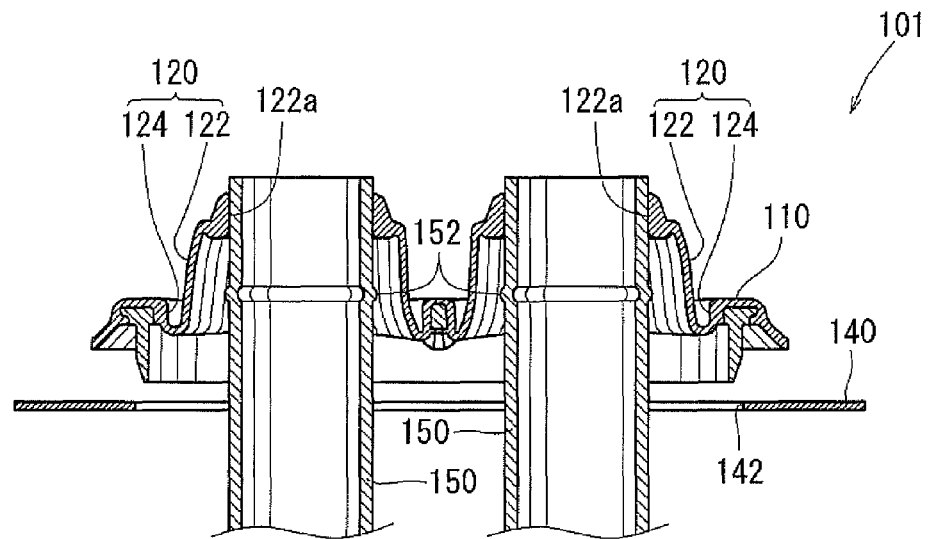
FIG. 9 is an explanatory cross-sectional view illustrating the grommet attaching operation, which view corresponds to an intermediate condition of the grommet attaching operation.
Figure 10:
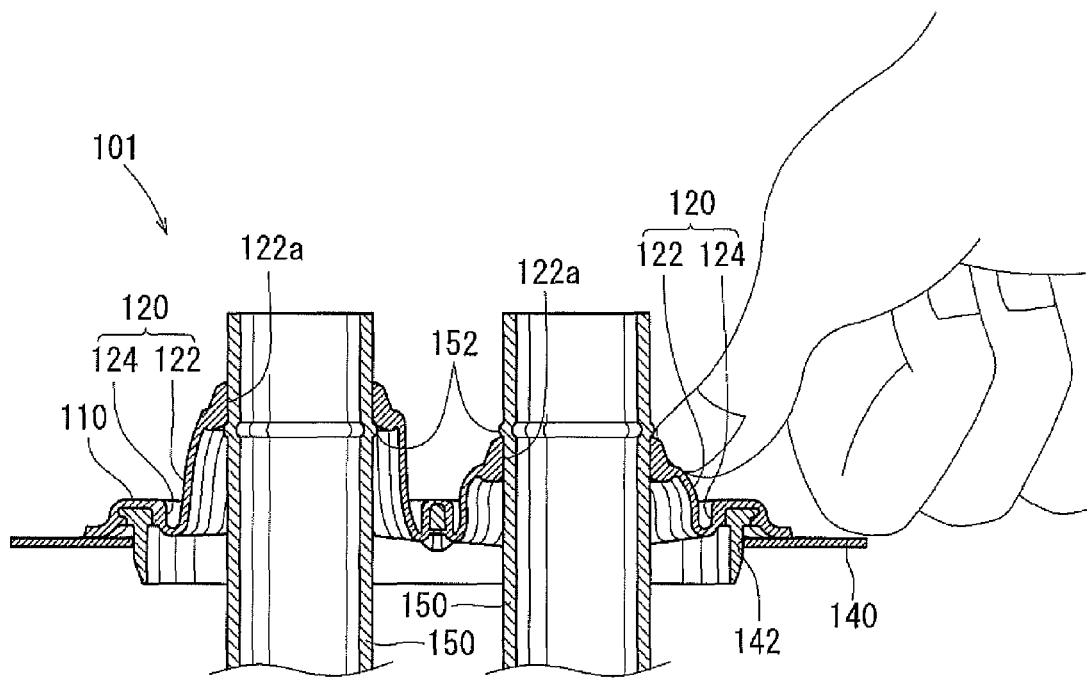
FIG. 10 is an explanatory cross-sectional view illustrating the grommet attaching operation, which view corresponds to a condition in which the grommet is incompletely attached to the panel insertion hole.
Figure 11:
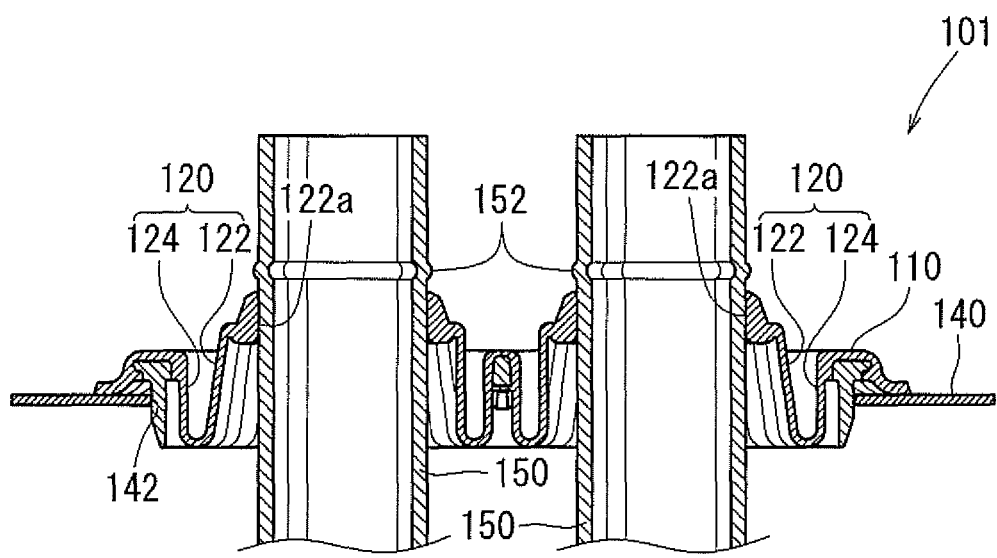
FIG. 11 is an explanatory cross-sectional view illustrating the grommet attaching operation, which view corresponds to a condition in which the grommet is completely attached to the panel insertion hole.

As shown in FIGS. 1(A) to 3, the grommet 1 may mainly include a plate-shaped base 10 that is configured to be introduced into an insertion hole 42, and at least one (two in this embodiment) boots 20 that are integrally formed in the base 10 and have a thinned wall thickness. The base 10 may have an annular lip 10a that is circumferentially formed therein. The annular lip 10a may preferably be flared outwardly, so as to be reliably contact a surface of the panel 40 when the grommet 1 is attached to the insertion hole 42 of the panel 40 (FIG. 6). Further, the base 10 may have an annular flame 12 (which may be referred to as a fitting member) made of a resinous material. The frame 12 may be configured to fit into the insertion hole 42 (FIG. 6).

The frame 12 may have a plurality of (four in this embodiment) engagement strips 12a that are formed therein. The engagement strips 12a may be capable of engaging a periphery of the insertion hole 42 when the base 10 is introduced into the insertion hole 42. Further, because each of the engagement strips 12a may have a known structure, a detailed description thereof may be omitted.

The boots 20 may be juxtaposed to each other. The boots 20 may be composed of frustoconical (truncated cone-shaped) main portions 22, and connecting portions (intermediate portion) 24. The main portions 22 may preferably have insertion bores 22a into which the pipes 50 are respectively inserted. The insertion bores 22a may be formed in tapered end portions of the main portions 22. The connecting portions 24 may be respectively folded back from circumferential bottom peripheries of the main portions 22 via folded back portions R and may be connected to the base 10. According to the grommet 1 thus constructed, the main portions 22 of the boots 20 can be flexibly displaced or moved relative to the base 10. Therefore, even if the pipes 50 are not attached or positioned in place, i.e., even if there are variations in attaching positions of the pipes 50, the main portions 22 can absorb such variations, which will be hereinafter described.

As shown in FIGS. 1(A), 1(B), 3 and 4(B), each of the boots 20 may have a plurality of (three in this embodiment) ribs 30 that are configured to restrict the main portion 22 of the boots 20 from being axially displaced relative to the base 10. The ribs 30 may respectively be circumferentially formed in the folded back portion R in equal intervals, so as to bridge the main portion 22 and the connecting portion 24. In other words, the ribs 30 may respectively be formed in the main portion 22 and the connecting portion 24 while straddling the folded back portion R. In particular, each of the ribs 30 may preferably have a substantially crank shape, so as to effectively prevent tightness or stiffness that is possibly produced between the main portion 22 and the connecting portion 24 when each of the ribs 30 functions or acts to restrict the main portion 22 from being axially displaced relative to the base 10.

Further, each of the insertion bores 22a of the main portions 22 may preferably have a diameter that is slightly smaller than an outer diameter of each of the pipes 50. Therefore, when the pipes 50 are introduced into the insertion bores 22a, the main portions 22 can reliably contact the pipes 50, so that a sealing performance between the pipes 50 and the insertion bores 22a can be increased. As a result, the panel insertion hole 42 of the panel 40 can be sufficiently sealed.

The base 10 and the boots 20 may preferably be integrally formed by a flexible or soft synthetic resinous material, e.g., an elastomer. Conversely, the flame 12 may preferably be integrally formed by a rigid or hard synthetic resinous material, e.g., polypropylene (PP). Further, the base 10, the boots 20 and the flame 12 may preferably be integrally formed by two-color molding of the soft resinous material and the hard resinous material.

Next, an attaching operation of the grommet 1 thus constructed to attach the insertion hole 42 of the panel 40 will now be described in detail with reference to FIGS. 4(A), 5 and 6.

Figure 1:
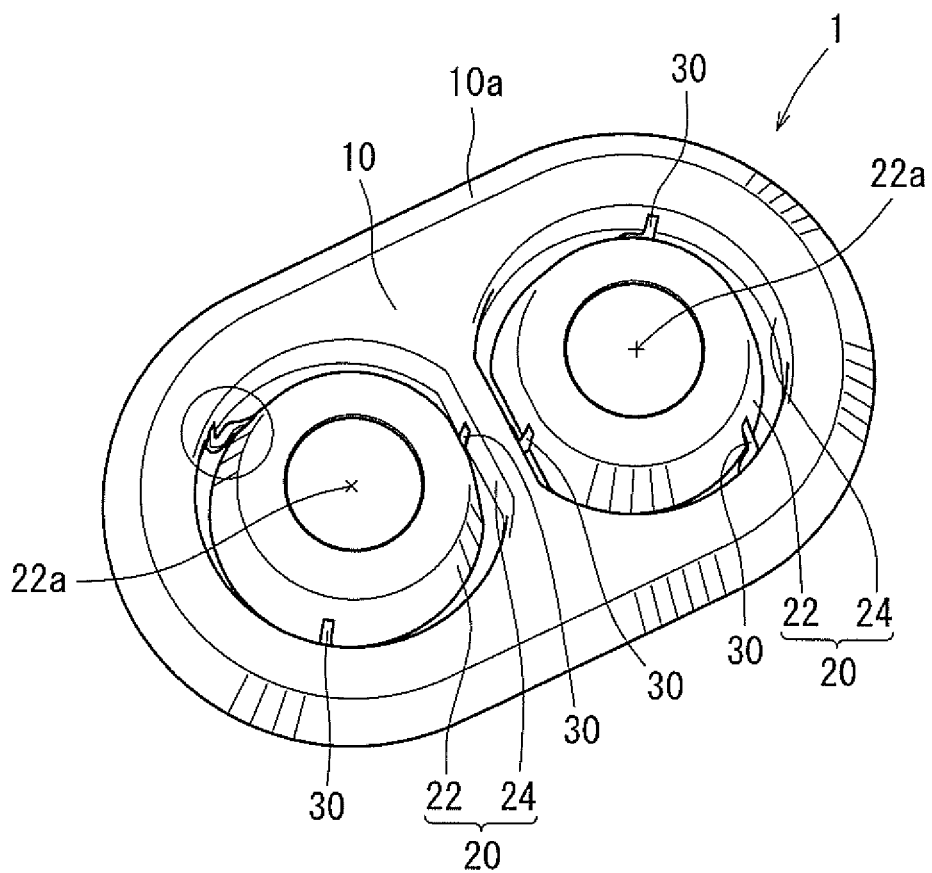
FIG. 1(A) is a perspective view of a grommet according to a representative embodiment of the present invention, which is viewed from above.
FIG. 1(B) is an enlarged view of an encircled portion of FIG. 1(A)
Figure 1:
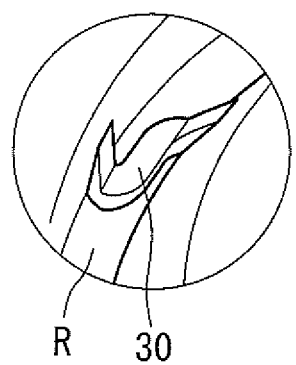
Figure 2:
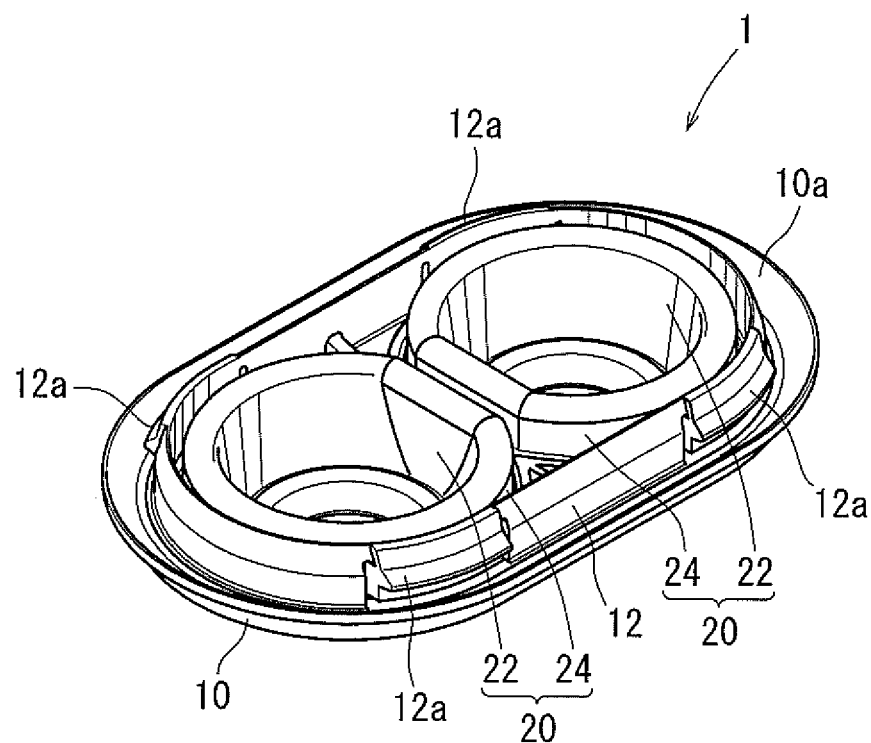
FIG. 2 is a perspective view of the grommet, which is viewed from below.
Figure 3:
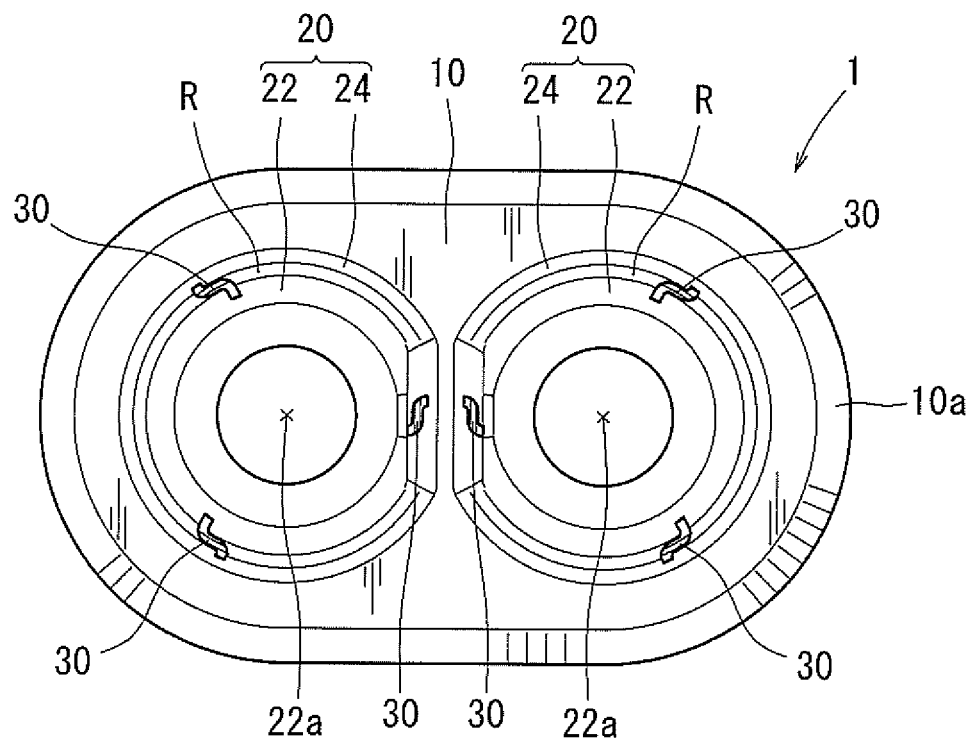
FIG. 3 is a plan view of FIG. 1.
Figure 4A:
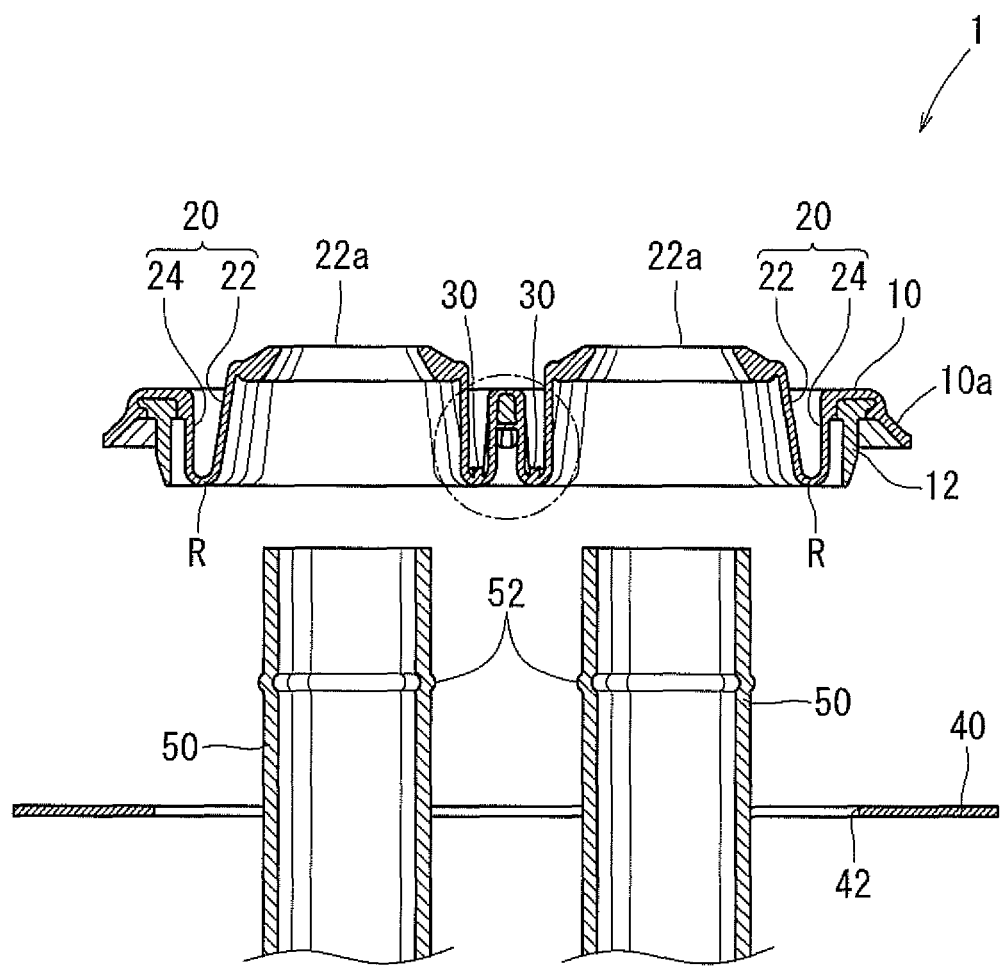
FIG. 4(A) is an explanatory cross-sectional view illustrating a grommet attaching operation, which view corresponds to a condition before the grommet is attached to a panel insertion hole through which pipes are passed.
Figure 4B:
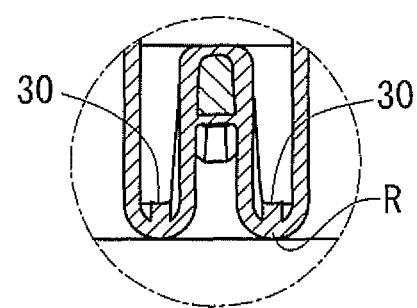
FIG. 4(B) is an enlarged view of an encircled portion of FIG. 4(A)
Figure 5:
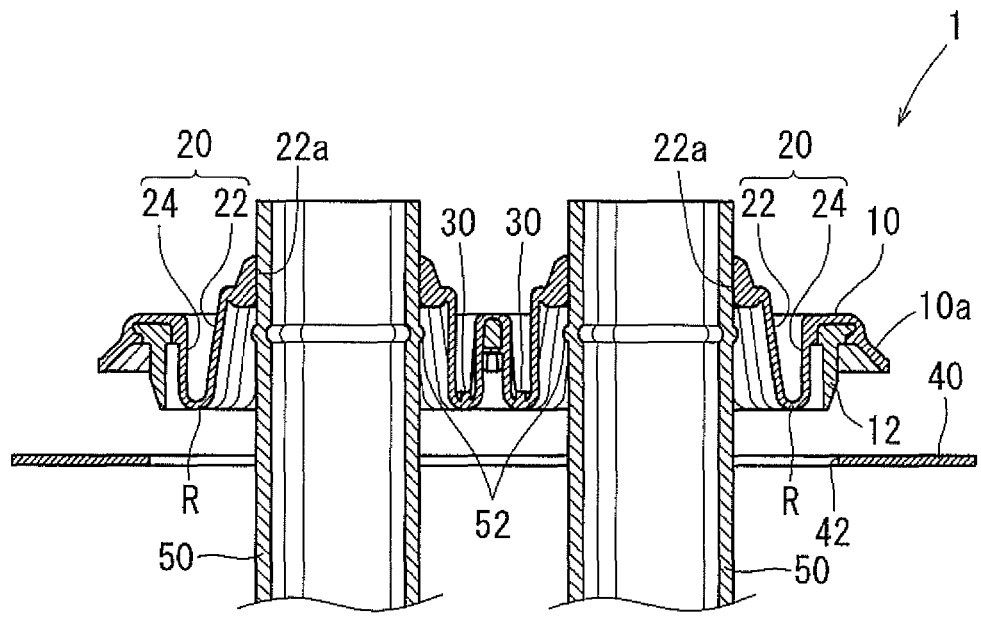
FIG. 5 is an explanatory cross-sectional view illustrating the grommet attaching operation, which view corresponds to an intermediate condition of the grommet attaching operation.

First, as shown in FIG. 4(A), the grommet 1 is positioned such that the insertion bores 22a of the main portions 22 of the boots 20 are aligned with the pipes 50. Further, the pipes 50 are previously positioned in place while they are passed through the insertion hole 42 of the panel 40. Thereafter, as shown in FIG. 5, the base 10 of the grommet 1 is pressed toward the insertion hole 42 while the pipes 50 are respectively introduced into the insertion bores 22a. As a result, the base 10 moves toward the insertion hole 42 while the main portions 22 are guided by the pipes 50.

As shown in FIG. 6, when the base 10 is further pressed toward the insertion hole 42 until the base 10 is completely introduced into the insertion hole 42, the frame 12 of the base 10 can fit into the insertion hole 42. At this time, the engagement strips 12a (which are not shown in FIG. 6) can engage the periphery of the insertion hole 42, so that the base 10 can be secured to the insertion hole 42. Further, the annular lip 10a of the base 10 can simultaneously contact the surface of the panel 40. Thus, the grommet 1 can be attached to the insertion hole 42 through which the pipes 50 are passed, so that the insertion hole 42 can be sealed.

As previously described, each of the insertion bores 22a is shaped such that the diameter thereof is slightly smaller than the outer diameter of each of the pipes 50. Therefore, when the base 10 is pressed toward the insertion hole 42, the connecting portions 24 of the boots 20 can be applied with forces in a direction to unfold or stretch the folded back portions R due to frictional forces produced between the pipes and the insertion bores 22a or interference or contact of the main portions 22 with projected portions 52 that may be inherently formed in the pipes 50. As will be recognized, examples of the projected portions 52 are annular projections that are formed in an outer circumferential surface of the pipes 50. The annular projections may function as stoppers when hoses (not shown) are connected to end portions of the pipes 50.

However, as previously described, the ribs 30 are formed in the main portion 22 and the connecting portion 24. Therefore, even when the connecting portions 24 are applied with such forces, the main portion 22 can be prevented from being axially displaced relative to the base 10. As a result, when the grommet 1 is attached to the insertion hole 42, the folded back portions R of the connecting portions 24 can be prevented from being unfolded or stretched, so that the main portions 22 can be prevented from being held while it is projected from the base 10. That is, when the grommet 1 is attached to the insertion hole 42, the main portions 22 can be automatically positioned and held within the base 10.

Therefore, the grommet 1 can be easily and reliably attached to the insertion hole 42 by simply pressing the base 10 toward the insertion hole 42 without additional work. Thus, the grommet 1 can be quickly attached to the insertion hole 42. This means that working efficiency of a grommet attaching operation can be increased.

Further, as each of the ribs 30 has the crank shape. Therefore, each of the ribs 30 can function to prevent the main portion 22 from being axially displaced relative to the base 10 while effectively preventing tightness or stiffness that can be produced between the main portion 22 and the connecting portion 24.

Naturally, various changes and modifications may be made to the present invention without departing from the scope of the invention. For example, in the embodiment, the two pipes 50 are exemplified as at least one pipes. However, the at least one pipes 50 may be a single pipe or three or more pipes. In such a case, the grommet 1 may have a single boot or three or more boots.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A grommet configured to seal an insertion hole formed in a panel into which a pipe is inserted, comprising:
    a base that is configured to be connected to the insertion hole,
    a boot that is integrally formed in the base and has a thinned wall thickness, and
    at least one rib that is formed in the boot,
    wherein the boot has a truncated cone-shaped main portion having an insertion bore into which the pipe can be inserted, and a connecting portion that is folded back from a circumferential periphery of the main portion via a folded back portion and is connected to the base,
    wherein the at least one rib is formed in the main portion and the connecting portion while straddling the folded back portion, so as to restrict the main portion from being axially displaced relative to the base;
    wherein the at least one rib is shaped to have a substantially crank shape, and
    wherein the at least one rib has an asymmetrical shape so as to be different in height at both ends thereof.

2. The grommet as defined in claim 1, wherein the base has a fitting member that is configured to be connected to the insertion hole, and wherein the fitting member is made of a material different from the base.

3. The grommet as defined in claim 2, wherein the fitting member is formed by a rigid synthetic resinous material and has at least one engagement strip that is configured to engage the insertion hole.

\* \* \* \* \*

UNITED STATES PATENT AND TRADEMARK OFFICE
CERTIFICATE OF CORRECTION

PATENT NO.        : 8,572,806 B2                                     Page 1 of 1
APPLICATION NO.   : 13/480602
DATED             : November 5, 2013
INVENTOR(S)       : Toshio Iwahara et al.

It is certified that error appears in the above-identified patent and that said Letters Patent is hereby corrected as shown below:

On the Title page item (73) Assignee:

"Daiwa Kasei Kabushiki Kaisha, Aichi-ken (JP)"

should be:  Daiwa Kasei Kabushiki Kaisha, Aichi-ken (JP) and
            Toyota Shatai Kabushiki Kaisha, Aichi-ken (JP)

Signed and Sealed this
Eighth Day of March, 2016

Michelle K. Lee
*Director of the United States Patent and Trademark Office*